M. HANSEN.
EYEGLASSES.
APPLICATION FILED JULY 24, 1912.
1,055,904. Patented Mar. 11, 1913.
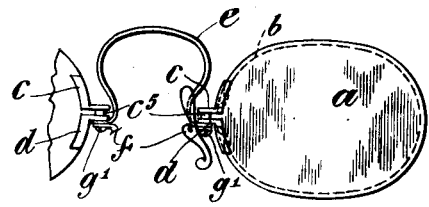
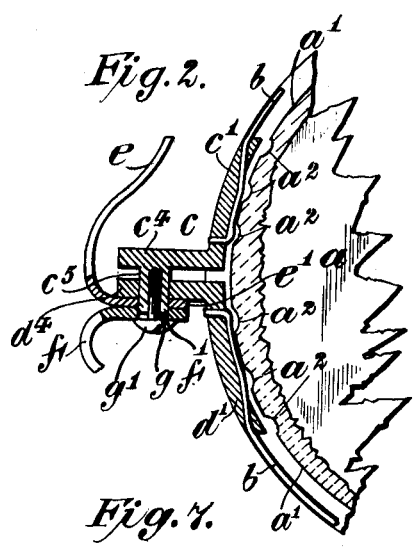
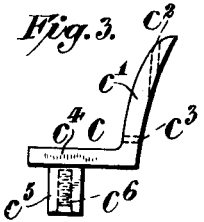
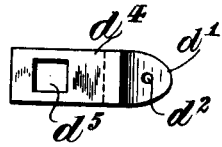
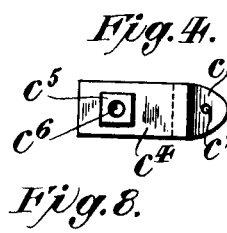
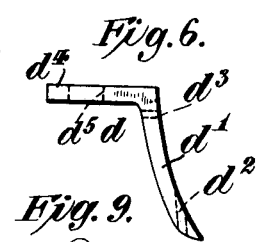
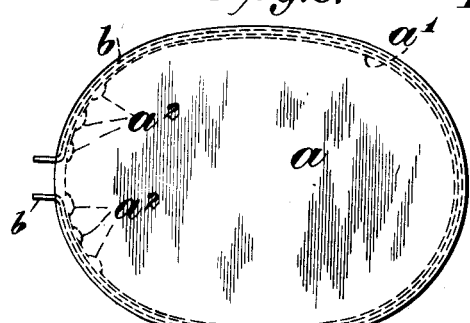
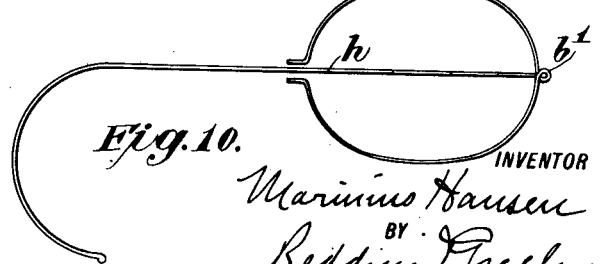

UNITED STATES PATENT OFFICE.

MARINIUS HANSEN, OF NEW ROCHELLE, NEW YORK, ASSIGNOR TO FERDINANDA P. HANSEN, OF BROOKLYN, NEW YORK.

EYEGLASSES.

1,055,904.  Specification of Letters Patent.  Patented Mar. 11, 1913.

Application filed July 24, 1912. Serial No. 711,242.

*To all whom it may concern:*

Be it known that I, MARINIUS HANSEN, a subject of the King of Norway, residing in New Rochelle, Westchester county, State of New York, have invented certain new and useful Improvements in Eyeglasses, of which the following is a specification, reference being had to the accompanying drawing, which forms a part hereof.

It has been proposed heretofore to groove the edges of the lenses of eye glasses and spectacles for the reception of wires by which the lenses are secured to the frames, so that the eye glasses or spectacles shall have the appearance of rimless glasses or spectacles while the lenses are nevertheless protected by the wires from injury and are held firmly to the frame without danger of slipping or loosening. Thus far, however, there seems to have been produced no such eye glasses or spectacles which find favor as marketable articles. This is due undoubtedly to the fact that, prior to the present invention, there have been devised no satisfactory means for securing the wires about the lenses and to the frame.

It is the object of this invention, therefore, to provide satisfactory and efficient means for thus securing the wires about the lenses and to the frame.

The invention will be fully explained hereinafter with reference to the accompanying drawing in which it is illustrated and in which—

Figure 1 is a view in elevation of a portion of an eye glass constructed in accordance with the invention, one lens with its encircling wire and a portion of the frame being shown. Fig. 2 is a detail view, partly in section and on a much larger scale, to show the means for securing the wire about the lens and to the frame. Figs. 3 and 4 are detail views of the upper member of the strap and stud. Figs. 5 and 6 are detail views of the lower member of the strap and stud. Fig. 7 is a detail view of the end of the spring. Fig. 8 is a detail view showing a lens with the wire in position thereon, but without the stud. Fig. 9 is a partial section on the shorter diameter of the lens. Fig. 10 is a detail view showing a wire prepared for application to the lens of spectacles, the corresponding temple being also shown.

The lens $a$ is formed substantially as usual except that it has in its edge a groove $a'$, shown clearly in Fig. 9 and indicated in Figs. 2 and 8. The groove is deep enough to receive a wire $b$ so that it is not clearly visible except when the lens is viewed on edge. The ends of the wire $b$ are secured together and to the frame by means which will now be described and without any twisting of the ends of the wire, which prevents the wire from lying smoothly in the groove, and without any soldering, which is liable to result in fracture of the lens.

The strap portion $c'$ of the upper strap and stud member $c$ is provided with a perforation $c^2$ which is extended inwardly through the strap $c'$ near its upper end, and with a transverse perforation $c^3$ near the union of the strap portion $c'$ with the stud portion $c^4$. In like manner the strap portion $d'$ of the lower strap and stud member $d$, is provided near its extremity with a perforation $d^2$ which is extended inwardly and, near its union with the stud portion $d^4$, with a transverse perforation $d^3$. The upper strap and stud member $c$ is provided with a lug $c^5$ which is preferably squared and is tapped, at $c^6$ to receive a screw. The stud portion $d^4$ of the strap and stud member $d$ is provided with an aperture $d^5$ to fit friction tight on the lug $c^5$. The spring $e$ has its end $e'$ also formed with an aperture $e^2$ to fit upon the lug $c^5$, while the guard $f$ likewise is provided with an aperture $f'$ to fit upon the lug. A single screw $g$, having a head $g'$ larger than the lug is threaded into the lug, from the underside, as clearly shown in Fig. 2, and serves alone to hold all of the parts together without requiring the use of any other screw.

Each end of the wire $b$ is passed through the perforations in the corresponding strap member $c'$ and $d'$, being passed inwardly through the perforations $c^2$ or $d^2$ as the case may be and then outwardly through the perforations $c^3$ or $d^3$ as the case may be. The wire is thus secured firmly to the strap and stud members, without twisting or soldering and without any liability to become loosened.

The friction tight fit of the lug $c^5$ of the upper strap and stud member in the aperture $d^5$ of the lower strap and stud member assists in the assembling of the parts of the glasses or spectacles, for when the wire, with its ends secured to the straps, has been placed about the lens and the lug inserted in the aperture the lug will there remain without slipping. It is then an easy matter to apply the spring and the guard and to insert the screw to bind all of the parts together, the screw being inserted from the underside of the stud and therefore always readily accessible regardless of the length of the stud and the form of the frame or spring.

If desired, slight depressions $a^2$ may be ground in the edge of the lens, at the bottom of the groove $a'$, to receive the slight bulge of the wire $b$ at the points where it passes through the perforations in the straps.

The same construction is readily adapted to spectacles, as will be apparent by examination of Fig. 10. As there shown, the wire $b$, which has its ends engaged with the frame as before, has at the other extremity of the major axis of the lens an eye $b'$ which is formed by a single twist, the overlying portions being pressed together by pliers so that the eye is permanent. To this eye is connected the temple $h$ in any convenient manner. Obviously this eye might serve, if desired, for the attachment of a cord or chain as well as the temple.

It will now be seen not only that the lens is protected by a wire which is firmly secured in place about the lens and to the frame, but that this is accomplished without any twisting of the wire at its ends and without the use of solder, and that the stud, spring and guard are all firmly clamped together, at each end of the spring, by a single screw.

I claim as my invention:—

1. The combination with a lens, of a wire encircling the same, strap members to which the ends of the wire are secured, and means to secure the strap members together.

2. The combination with a lens of a wire encircling the lens and strap members having each a perforation into and through which the corresponding ends of the wire are passed.

3. The combination with a lens, of a wire encircling the lens, strap members having each two perforations into and through which the corresponding ends of the wire are passed, and means to secure the strap members together.

4. The combination with a lens having a groove in its edge, a wire encircling the lens in the groove, strap members to which the ends of the wire are secured, and means to secure the strap members together.

5. The combination with a lens having a groove in its edge, a wire encircling the lens in the groove, strap members having each two perforations into and through which the corresponding ends of the wire are passed, and means to secure the strap members together.

6. The combination with a lens of strap and stud members, the stud portion of one of said members having a lug and the stud portion of the other of the strap and stud members having an aperture to fit friction tight upon the lug.

7. The combination with a lens, of a wire encircling the lens, and strap and stud members to which the ends of the wire are secured, the stud portion of one of the said members having a lug and the stud portion of the other of the strap and stud members having an aperture to fit friction tight upon said lug.

8. The combination with a lens, stud and strap members, a spring, one of the strap and stud members having a lug while the other strap and stud member and the spring have each an aperture to fit the lug, and a single screw entering the lug and binding the parts together.

9. The combination with a lens, a wire encircling the same, stud and strap members to which the ends of the wire are secured, a spring, one of the strap and stud members having a lug while the other strap and stud member and the spring have each an aperture to fit the lug, and a single screw entering the lug and binding the parts together.

This specification signed and witnessed this 18th day of July A. D., 1912.

MARINIUS HANSEN.

Signed in the presence of—
  J. C. LITTLE,
  F. E. HULL.